United States Patent Office 3,517,969
Patented June 30, 1970

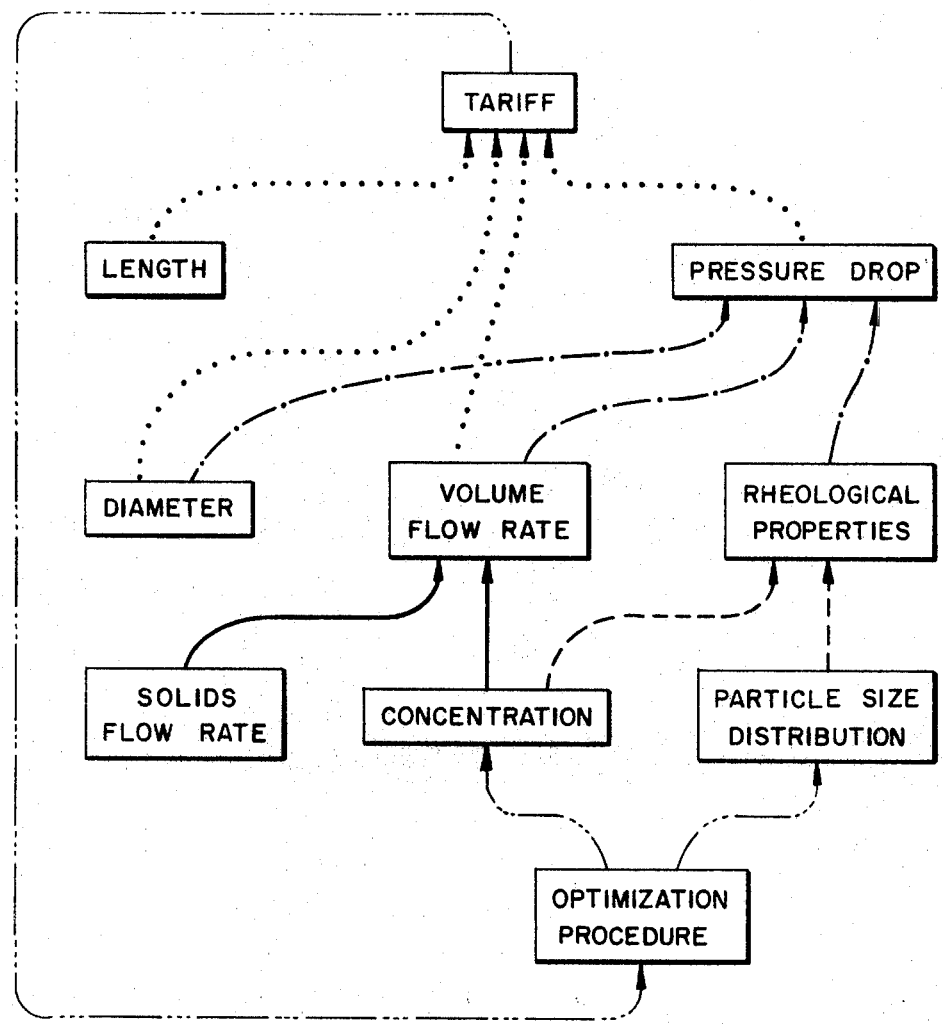

3,517,969
TRANSPORTATION OF PARTICLES BY PIPELINE
Moye Wicks III, Houston, Tex., assignor to Shell Oil Company, New York, N.Y., a corporation of Delaware
Filed Apr. 10, 1968, Ser. No. 720,268
Int. Cl. B65g 53/04
U.S. Cl. 302—66                                    3 Claims

ABSTRACT OF THE DISCLOSURE

A method of trasporting solids to a remote place through a pipeline as a solid particle-liquid slurry. A concentration and particle size distribution is selected and a slurry made up therefrom and flowed within a pipeline. The composition of this slurry which is necessary to obtain a specific rate of return is determined depending upon the pipeline diameter, length, volume flow rate and the pressure drop within the pipeline. The pressure drop of the slurry flowing within the pipeline is determined depending upon the pipeline diameter, the volume flow rate and the rheological properties of the slurry. The volume flow rate is determined from both the solids flow rate and the concentration of the slurry flowing within the pipeline. The rheological properties of the slurry are determined both from the concentration, shape, density, and particle size distribution of the solids and the density and viscosity of the liquid flowing within the pipeline. Finally, the concentration and particle size distribution which would optimize substantially the rate of return is determined and a slurry is made up therefrom and flowed within the pipeline.

BACKGROUND OF THE INVENTION

Field of the invention

The invention relates to the art of transporting solids through pipelines. More particularly, it relates to a method of transporting solids to a remote place as a solids-liquid slurry flowing within a pipeline.

Description of the prior art

Vast networks of pipelines, particularly in the southwestern portion of the United States, provide means for the transmission of petroeum crudes from production areas to refineries or to other transportation facilities. Similar pipelines also crisscross the other portions of the United States carrying, in addition to petroleum crudes, many other fluids, and in some cases fluid-solid mixtures.

As to the latter, it is known that granular solids of varying sizes may be lifted or transported in a carrier liquid that has a lower specific gravity than the solids by confining the liquid and solids in a pipeline and supplying the lifting or transporting energy by making the velocity of the carrier liquid sufficient to overcome the tendency of the solids to settle in the liquid.

A recently discovered process for transporting coal as an aqueous slurry has made it possible to now tarnsport coal over long distances through a pipeline. In reliance on this process, a commercial pipeline has been constructed to transport coal from a mine in southern Ohio to a consumer along the shores of Lake Erie—a distance of 108 miles. Several million tons of coal have been successfully transported over this distance through this commercial pipeline at a substantial savings in transportation costs as discussed in a U.S. Pat. No. 2,791,471 to Clancey et al. Presently, there are short-distance coal-water pipelines in operation in France, England and Russia. Since these transports contribute only a small amount to the total production cost of coal, only little attention has been paid to the economic efficiency of these pipelines, in which large lumps of coal are transported at velocities as high as 10 to 15 feet per second. Further, the particle size distribution of the coal is not controlled adequately which sometimes results in blockage of the line.

The foregoing is but one example of the application of modern technology to the transporting of solids within pipelines. An improved process for transporting the coal slurry of Pat. No. 2,791,471 is discussed in a U.S. Pat. No. 3,168,350 to Phinney et al. Further improvements in such processes would result in considerable savings in the transporting of coal and other solids as a solids-liquid slurry. The composition of a slurry strongly affects the economics of a slurry pipeline venture, but the way in which the composition of the slurry dictates rheological properties is complicated and, in deed, not formally understood.

SUMMARY OF THE INVENTION

It is an object of this invention to provide a method of transporting solids to a remote place as a solid particle-liquid slurry flowing within a pipeline wherein the particles are concentrated and distributed within the slurry so as to optimize substantially the rate of return.

It is a further object to provide such a method for transporting solids which circumvents both the necessity for knowledge of slurry rheology and the impractically large number of experiments needed to explore fully the effects of slurry composition.

The objects of this invention are carried out by selecting a concentration and particle size distribution and flowing this composition as a solid particle-liquid slurry within a pipeline of known length and diameter. The composition of this slurry which is necessary to obtain a specific rate of return is determined depending upon the pipeline diameter, length, volume flow rate and the pressure drop within the pipeline. The pressure drop of the slurry flowing within the pipeline is determined depending upon the pipeline diameter, the volume flow rate and the rheological properties of the slurry. The volume flow rate is determined from both the solids flow rate and the concentration of the slurry flowing within the pipeline. The rheological properties of the slurry are determined both from the concentration, shape, density and particle size distribution of the solids and the density and viscosity of the liquid flowing within the pipeline. Finally, the concentration and particle size distribution which would optimize substantially the rate of return is determined and a slurry is made up therefrom and flowed within the pipeline.

In a preferred embodiment of the invention, a pattern search method is used to determine the concentration and particle size distribution of the slurry which would optimize substantially the rate of return.

BRIEF DESCRIPTION OF THE DRAWING

The drawing is a diagram of a preferred method of carrying out the teachings of this invention.

DESCRIPTION OF THE PREFERRED EMBODIMENT

Throughout this specification, the terms "solid particle-liquid slurry," "solids-liquid mixture" and "slurry" will be used interchangeably. The term "tariff" is defined as the cost per quantity, such as dollars per ton, of the solids desired to be transported. Accordingly, a low tariff will result in a high rate of return and thus substantial savings in the transportation of such solids. When used throughout this specification, "rate of return" will include the tariff required to produce any particular rate of return.

The teachings of this invention are applicable to any solid particles which can be transported in a suitable liquid as a slurry, such as coal particles dispersed in water, sylvite particles dispersed in oil or brine, etc.

One of the principal factors tht influences the economics and operability of any slurry pipeline transportation system is the energy required to convey the solids-fluid slurry at a given velocity from one location to another through the pipeline. This energy bears a direct relation to the resistance to flow of the slurry and may be called, for convenience, the transport energy required to convey a given concentration by weight of solid particles in fluid through a pipeline at a given velocity. The transport energy may be expressed as the pressure drop experienced by the solids-fluid slurry per given length of pipeline. Conventional uints for expressing this pressure drop are pounds per square inch per mile of pipeline.

In designing a slurry for flowing within a pipeline, the effects on friction loss of two variables not encountered in a single phase system must be considered. These variables are the solids concentration and particle size distribution and can strongly affect the economics of the slurry pipeline investment because of their influence on pressure drop. It is necessary that they be set at optimum or nearly optimum levels so that the economic benefit from the investment can be a maximum.

The drawing shows a diagram of a method for finding the optimum slurry composition of a desired solids-fluid mixture. The method is particularly adapted to the process of transporting coal by pipeline as discussed in the Phinney et al. patent; however, these teachings apply with equal effectiveness to any slurry system.

Briefly, the method is essentially a sequential procedure of experimentation followed by evaluation. A composition and particle size distribution is selected and a solid particle-liquid slurry made up therefrom. This slurry is flowed within a pipeline. This pipeline may be a section of the pipeline through which the slurry is to be transported; conversely, the pipeline may form a portion of a bench-scale laboratory test line.

The rheological properties of slurry are then measured and a series of line diameters are selected, and, for each, the economic worth of the slurry is calculated using the rheological parameters to determine the pressure drop. Finally, the process is repeated using new values for the composition and particle size distribution of the slurry until the optimum rate of return has been sufficiently closely approximated.

Consideration of the large number of independent variables in the problem shows that the foregoing procedure cannot be practically followed for every slurry of interest, even over a relatively coarse grid of values. For example, the solids particle size distribution of the coal-water slurry discussed in the Phinney et al. patent is given by a sieve analyses showing the weight percent of the solids in each size range. There are six sieve sizes, and therefore, seven variables including the solids concentration. To measure the rheological behavior of every possible slurry at five levels of percent in each sieve range, for each of five concentrations, would require nearly sixteen thousand experiments requiring (at an hour each) a minimum of eight man-years. Moreover, the complexity of the way that slurry rheology depends on particle size distribution does not permit one to arbitrarily leave out any of the sieve ranges in order to reduce the size of the problem.

A secondary objective then, is to choose new values of the particle size distribution and concentration so as to minimize the number of experiments. There are four parts to the solution of the problem of finding the optimum slurry composition.

Referring now to the drawing, there is an economic model to relate pressure drop, volume flow rate, diameter, and length of the pipeline to the pipeline tariff. Second, there is a pressure drop model with which to correlate the rheological properties, volume flow rate and diameter of the pipeline. Next, there is a rheological property measurement technique to determine experimentally the effect of concentration and particle size variations. Finally, there is an optimum seeking method to minimize the number of experimental steps.

As can be seen in the drawing, the economic worth of the slurry is measured by the tariff associated with it. The optimum slurry is the one which minimizes the tariff necessary to earn a certain rate of return.

ECONOMIC MODEL

Many factors may be taken into consideration to calculate the tariff and approximate pipeline costs. Important parameters in the economic model may be: rate of return, income tax rate, ad valorem tax rate, project life, depreciation life, and depreciation schedule. Approximate capital costs may be computed using a fixed per inch-mile pipe cost and a per installed horsepower pump cost.

In this manner, the tariff at various values of pipe diameter, solids concentration, and pressure drop may be calculated. For example, a tariff table was prepared on a 300-mile pipeline having a solids flow rate of 6.4 million tons per year. This table covered the following ranges:

| | From | In increments of | To |
|---|---|---|---|
| Concentration, percent weight | 30 | 1 | 70 |
| Pipe diameter, in. (nominal) | 16 | 2 | 36 |
| Pressure gradient, P.s.f./ft.[1] | .01 | .01 | .50 |

[1] P.s.f./ft.=Pounds per square foot per foot.

PRESSURE DROP MODEL

The pressure drop is determined from the diameter, volume flow rate and rheological properties of the slurry. The Bingham plastic model has been found adequate to correlate the rheological behavior of slurries in regions of concentration above 10 or 15 percent by volume in homogeneous flow. An adequate discussion of the Bingham plastic model may be found in a book by W. L. Wilkinson, "Non-Newtonian Fluids," Pergammon Press, New York (1960). Pressure drop in laminar flow is computed from the Buckingham equation as discussed in the Wilkinson book knowing two properties of the slurry: the yield stress and the slope viscosity. In turbulent flow, the pressure drop is calculated using the usual Newtonian friction factor-Reynolds number relationship using the slope viscosity only, also as discussed in the Wilkinson book. Experimental measurements suggest a slight correction, $fc$, to the friction factor, $fm$, obtained from the Moody chart: $fc=0.85\ fm$. The pressure gradient is calculated using $fc$. The Moody chart is a graph showing how the friction factor $f$ is related to the dimensionless flow rate (or Reynolds Number) $R=DV\rho/\mu$, where D is the pipe diameter, V the average flow velocity, $\rho$ the fluid density, and $\mu$ the fluid viscosity. Knowing $f$, the pressure drop $\Delta P$ can be calculated:

$$\Delta P = \frac{f\rho V^2}{2g_cD} L$$

where $g_c$ is the gravitational conversion factor and L is the equivalent length of the pipe. This chart is discussed in a book by V. L. Streeter, "Handbook of Fluid Dynamics," 1st ed., McGraw-Hill, New York (1961). The correction factor 0.85 was arrived at by comparison of the experimentally measured pressure drop with predictions of the Moody chart. The fact that it is less than 1.0 has been observed before. The criterion for transition from laminar to turbulent is the calculated pressure drop itself; when $\Delta P/\Delta L$ for turbulent flow exceeds that calculated for laminar flow, the flow is considered turbulent.

RHEOLOGICAL PROPERTY MEASUREMENT TECHNIQUE

The rheological constants of each slurry is determined using a Fann Model 35 viscometer, as manufactured by the Fann Instrument Corporation of Houston, Tex. It has been found that it is possible to adequately scale up slurry rheology data from the Fann viscometer for a slurry in homogeneous flow. For example, for a fineparticle size coal slurry at concentrations of 40% w. and greater, homogeneous flow was observed to occur above very low velocities, of the order of one foot per second and less in a 2-inch pilot pipeline. Since the flow velocities in pipelines of commercial interest in accordance with this invention are all greater than one foot per second, it may be assumed that the commercial scale pressure drop can be adequately predicted from rheological data obtained with the Fann viscometer. Prior to making the rheological property measurements with the Fann viscometer, the slurry is preferably well agitated in order to achieve a near-homogeneous dispersion of solid particles in the liquid.

OPTIMUM SEEKING METHOD

At least a dozen methods are known for finding values of independent variables which optimize a dependent variable. These numerical techniques are surveyed by D. J. Wilde in his book, "Optimum Seeking Methods," Prentice-Hall, Englewood Cliffs, N.J. (1964) and the relative performance of each of eight optimum seeking methods is measured on five test functions by A. Leon in a book entitled "Recent Advances in Optimization Techniques," A. Lavi and T. P. Vogel, editors, John Wiley and Sons, Inc., New York (1966).

The method used for the slurry optimization problem of this invention is the "pattern search" method devolepd by R. Hooke and T. A. Jeeves as discussed in an article in the April 1961, issue of the Journal of the Association for Computer Machinery, vol. 8, Number 2. This method is preferred since it converges acceptably fast for problems involving a large number of independent variables. It is self-correcting in the presence of a reasonable amount of experimental error and it is practical to perform the required calculations by hand. Finally, in the "pattern search" method, it is not necessary to determine the derivatives of the function being optimized nor to know its algebraic form. A complete discussion of this method appears in the aforementioned article of Hooke and Jeeves. Accordingly, further discussion is deemed unnecessary.

It can be appreciated from the foregoing that any of the optimum seeking methods may be used; the pattern search method of Hooke and Jeeves being preferred for the reasons stated.

PROCEDURE

In the application of the teachings of this invention, a selected amount of solid particles desired to be transported as a solids-fluid slurry is crushed by means known in the art, such as passing the particles through a crushing plant, and classified into selected size ranges. Any concentration and particle size distribution desired could thus be closely approximated by mixing the proper amounts and proportions of each size range. Referring to the drawing, the pipeline length and design solids flow rate are fixed by the requirements of the pipeline system under consideration. The volume flow rate of the slurry is determined by the specified concentration. The concentration and particle size distribution dictate the rheological behavior of the slurry, and this is then measured experimentally as discussed herein above under the heading "Rheological Property Measurement Technique." For each of a set of pipe sizes, the pressure drop is calculated knowing the rheological constants and the volume flow rate. The resulting tariffs are then found using the tariff table discussed hereinabove and knowing the pressure drops along with the volume flow rate. The pipe diameter which gives a minimum tariff is given as a by-product of these calculations.

Consistent with the rules of the pattern search procedure, small changes or perturbations are made in concentration and particle size distribution. The tariff associated with each new slurry is then determined. The set of changes which produce lower tariffs form the basis for a so-called "pattern" move to a new concentration and particle size distribution. This pattern move changes the slurry composition to a new value which shows an even lower tariff based on the results of the small changes. As discussed hereinabove, various optimum seeking methods may be used instead of the pattern search method to find the optimum slurry composition; however, the pattern search method is preferred since it enables one to arrive at the optimum slurry composition in a relatively small number of experiments. The various size ranges of the solids may be mixed so as to form the slurry having the desired characteristics to minimize substantially the cost of transporting the slurry.

In summary, the method of this invention may be used to find the best slurry composition for solids in carrier liquids, moving at different capacities over different distances. The principles disclosed here may be applied to each case in order to realize the maximum economic advantage from the particular slurry pipeline system.

I claim as my invention:

1. A method of transporting solids to a remote place through a pipeline as a solid particle-fluid slurry, the process comprising the steps of:
    selecting a concentration and particle size distribution and making up a solid particle-liquid slurry therefrom;
    flowing said slurry within a pipeline;
    adjusting the composition of this slurry so as to obtain a specific rate of return depending upon the pipeline diameter, length, volume flow rate and pressure drop within said pipeline;
    adjusting said pressure drop of said slurry flowing within the pipeline depending upon said pipeline diameter, the volume flow rate of said slurry and the rheological properties of said slurry;
    adjusting said volume flow rate of said slurry in accordance with the solids flow rate and concentration of the slurry flowing within said pipeline;
    determining said rheological properties of said slurry from the concentration, shape, density and particle size distribution of the solids and the density and viscosity of the liquid flowing within said pipeline;
    determining said concentration and particle size distribution which would substantially optimize said rate of return;
    making up a slurry adapted to optimize substantially said rate of return in accordance with the predetermined rheological properties, concentration and particle size distribution of the slurry; and
    flowing said latter slurry within said pipeline.

2. The method of claim 1 wherein the step of determining said concentration and particle size distribution which would optimize substantially said rate of return includes the step of making a plurality of small changes in said concentration and particle size distribution and determining the rate of return for each change until a substantially optimum slurry composition is arrived at.

3. The method of claim 1 wherein the step of making up a slurry adapted to optimize substantially said rate of return includes the step of mixing proper amounts and proportions of various sizes of particles until a concentration and particle size distribution is arrived at which optimizes substantially the rate of return.

References Cited

UNITED STATES PATENTS

| 2,791,471 | 5/1957 | Clancey et al. | 302—66 |
| 3,073,652 | 1/1963 | Reichl | 302—66 |
| 3,168,350 | 2/1965 | Phinney et al. | 302—14 |

ANDRES H. NIELSEN, Primary Examiner